(12) United States Patent
Lee et al.

(10) Patent No.: US 10,263,758 B2
(45) Date of Patent: Apr. 16, 2019

(54) HALF DUPLEX FDD WTRU WITH SINGLE OSCILLATOR

(71) Applicant: INTERDIGITAL PATENT HOLDINGS, INC., Wilmington, DE (US)

(72) Inventors: Moon-il Lee, Melville, NY (US); Janet A. Stern-Berkowitz, Little Neck, NY (US); Virgil Comsa, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 145 days.

(21) Appl. No.: 15/128,278

(22) PCT Filed: Mar. 27, 2015

(86) PCT No.: PCT/US2015/023130
§ 371 (c)(1),
(2) Date: Sep. 22, 2016

(87) PCT Pub. No.: WO2015/148997
PCT Pub. Date: Oct. 1, 2015

(65) Prior Publication Data
US 2018/0176000 A1   Jun. 21, 2018

Related U.S. Application Data

(60) Provisional application No. 61/971,798, filed on Mar. 28, 2014.

(51) Int. Cl.
*H04B 7/00* (2006.01)
*H04L 5/16* (2006.01)
(Continued)

(52) U.S. Cl.
CPC .............. *H04L 5/16* (2013.01); *H04L 1/1822* (2013.01); *H04L 1/1854* (2013.01);
(Continued)

(58) Field of Classification Search
CPC ........................ H04W 52/0219; H04W 72/121
(Continued)

(56) References Cited

U.S. PATENT DOCUMENTS 5,363,368 A   11/1994 Vatt et al.
5,515,035 A   5/1996 Gut
(Continued)

FOREIGN PATENT DOCUMENTS

CN   101217780 A   7/2008
CN   101646257 A   2/2010
(Continued)

OTHER PUBLICATIONS

Huawei et al., "HD-FDD operation of low cost UEs based on the LS reply from RAN4," 3GPP TSG RAN WG1 Meeting #76bis, R1-141118, Shenzhen, China (Mar. 31-Apr. 4, 2014).
(Continued)

*Primary Examiner* — Dmitry Levitan
(74) *Attorney, Agent, or Firm* — Volpe and Koenig, P.C.

(57) ABSTRACT

Half duplex (HD) frequency division duplexing (FDD) in a wireless transmit-receive unit (WTRU) using a single oscillator (SO) for uplink (UL) and downlink (DL), which may contribute to reduced costs of implementation. Approaches to the resolution of scheduling issues which may result from increased switching time versus implementations using separate oscillators are discussed, including indication of SO-HD-FDD capability, scheduling for collision avoidance, enhanced node-b (eNB) receiver implementations, link adaptation for missed detected physical downlink control and shared channels, collision handling, DL measurement, and burst based transmissions.

16 Claims, 10 Drawing Sheets

(51) Int. Cl.
  *H04L 1/18* (2006.01)
  *H04W 72/10* (2009.01)
  *H04W 72/12* (2009.01)
  *H04W 4/70* (2018.01)
  *H04L 5/00* (2006.01)
(52) U.S. Cl.
  CPC ........... *H04L 1/1858* (2013.01); *H04W 72/10* (2013.01); *H04L 5/0048* (2013.01); *H04L 5/0053* (2013.01); *H04W 4/70* (2018.02); *H04W 72/12* (2013.01); *H04W 72/1278* (2013.01)
(58) Field of Classification Search
  USPC ........ 370/310, 311, 328, 329, 343, 344, 349
  See application file for complete search history.

(56) References Cited

U.S. PATENT DOCUMENTS

| | | | |
|---|---|---|---|
| 9,042,280 B2* | 5/2015 | Ratasuk | H04W 72/1205 370/296 |
| 9,215,039 B2* | 12/2015 | Yin | H04L 1/1822 |
| 9,215,060 B2* | 12/2015 | You | H04L 5/14 |
| 9,215,699 B2 | 12/2015 | Bai | |
| 9,306,726 B2* | 4/2016 | Kishiyama | H04L 5/0007 |
| 9,398,607 B2 | 7/2016 | Seo et al. | |
| 9,674,796 B2* | 6/2017 | Nan | H04W 74/08 |
| 9,749,120 B2* | 8/2017 | Siomina | H04L 5/16 |
| 9,756,637 B2* | 9/2017 | Liu | H04W 72/0446 |
| 2012/0076028 A1 | 3/2012 | Ko et al. | |
| 2013/0083710 A1 | 4/2013 | Chen et al. | |
| 2013/0242824 A1 | 9/2013 | Lee et al. | |
| 2016/0308660 A1* | 10/2016 | Cui | H04L 5/003 |

FOREIGN PATENT DOCUMENTS

| | | |
|---|---|---|
| WO | WO2009154352 A2 | 12/2009 |
| WO | 2010/037013 | 4/2010 |
| WO | WO2010037013 A2 | 4/2010 |
| WO | WO2012150887 A1 | 11/2012 |

OTHER PUBLICATIONS

Huawei et al., "Discussion on HD-FDD operation of low cost MTC UEs," 3GPP TSG RAN WG1 Meeting #77, R1-141942,Seoul, Korea (May 19-23, 2014).
Mitsubishi Electric et al., "Idle period and frame designs for half duplex communications," TSG RAN WG1, R1-051096, San Diego, California USA (Oct. 10-14, 2005).
Third Generation Partnership Project, "Technical Specification Group Radio Access Network; Evolved Universal Terrestrial Radio Access (E-UTRA); Physical channels and modulation (Release 12)," 3GPP TS 36.211 V12.1.0 (Mar. 2014).
Third Generation Partnership Project, "Technical Specification Group Radio Access Network; Evolved Universal Terrestrial Radio Access (E-UTRA); Physical channels and modulation (Release 11)," 3GPP TS 36.211 V11.6.0 (Sep. 2014).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.5.0 (Dec. 2013).
Third Generation Partnership Project, "Technical Specification Group Radio Access Network; Evolved Universal Terrestrial Radio Access (E-UTRA); Physical channels and modulation (Release 12)," 3GPP TS 36.211 V12.5.0 (Mar. 2015).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.8.0 (Jun. 2013).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.4.0 (Dec. 2013).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.5.1 (Sep. 2014).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.0.0 (Dec. 2013).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.12.0 (Mar. 2014).
Third Generation Partnership Project, "Technical Specification Group Radio Access Network; Evolved Universal Terrestrial Radio Access (E-UTRA); Physical layer procedures (Release 11)," 3GPP TS 36.213 V11.6.0 (Mar. 2014).
Third Generation Partnership Project, "Technical Specification Group Radio Access Network; Evolved Universal Terrestrial Radio Access (E-UTRA); Physical layer procedures (Release 12)," 3GPP TS 36.213 V12.1.0 (Mar. 2014).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.4.0 (Mar. 2015).
Third Generation Partnership Project, "Technical Specification Group Radio Access Network; Evolved Universal Terrestrial Radio Access (E-UTRA); Physical layer procedures (Release 11)," 3GPP TS 36.213 V11.10.0 (Mar. 2015).
Third Generation Partnership Project, "Technical Specification Group Radio Access Network; Evolved Universal Terrestrial Radio Access (E-UTRA); Physical layer procedures (Release 12)," 3GPP TS 36.213 V12.5.0 (Mar. 2015).

* cited by examiner

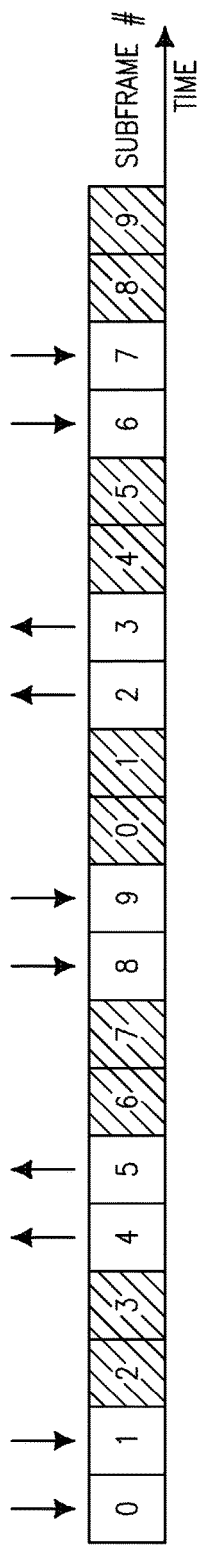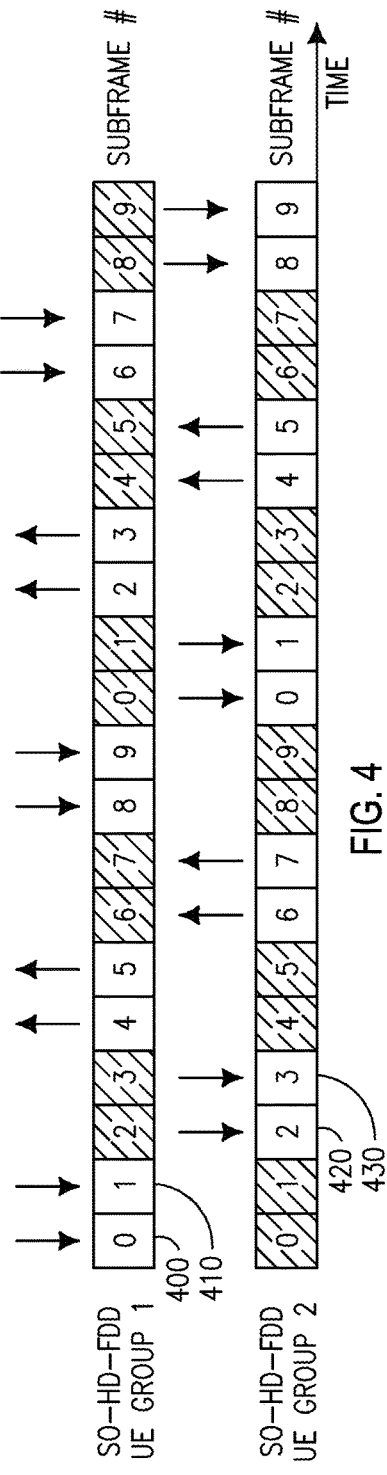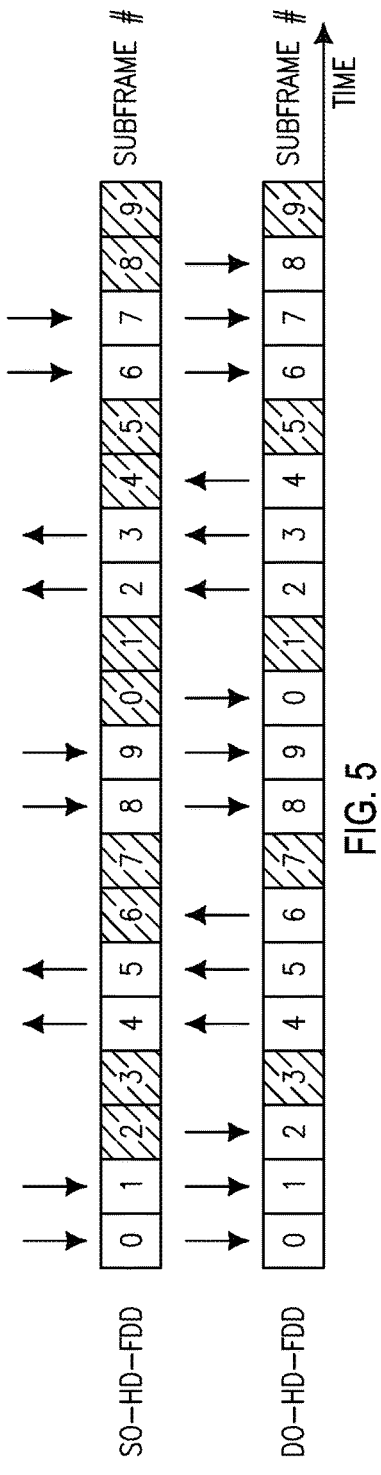

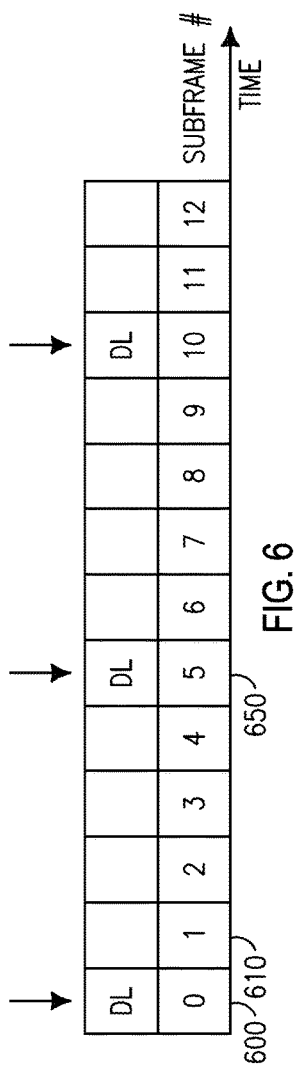
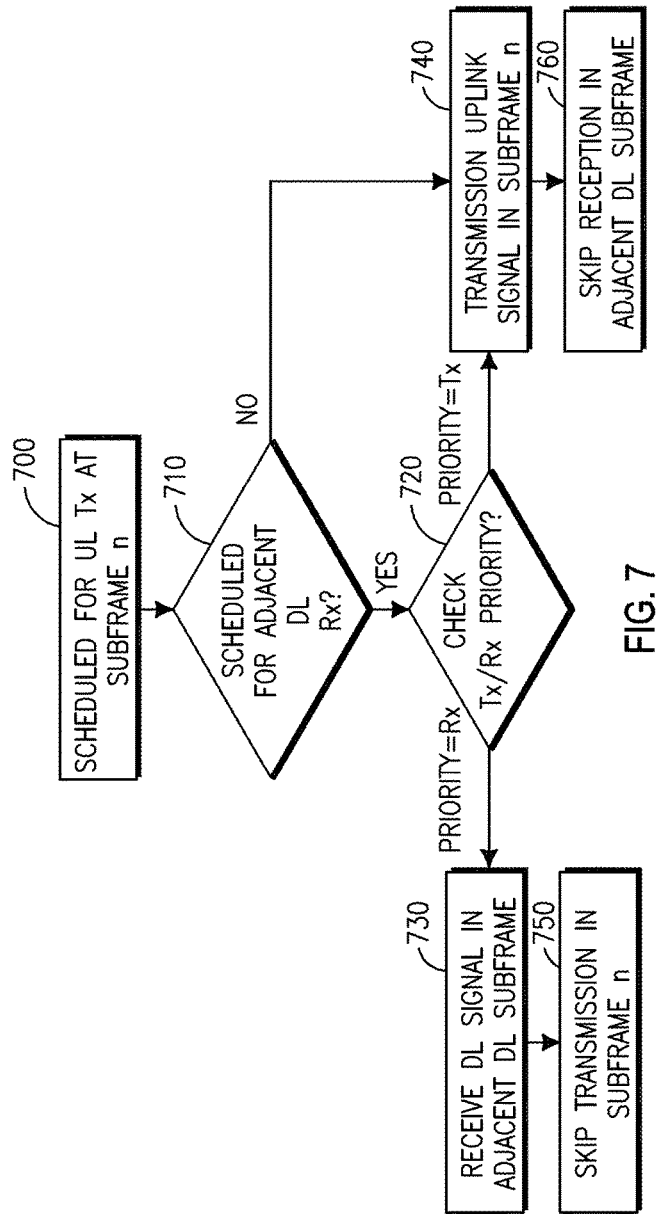
FIG. 6
FIG. 7

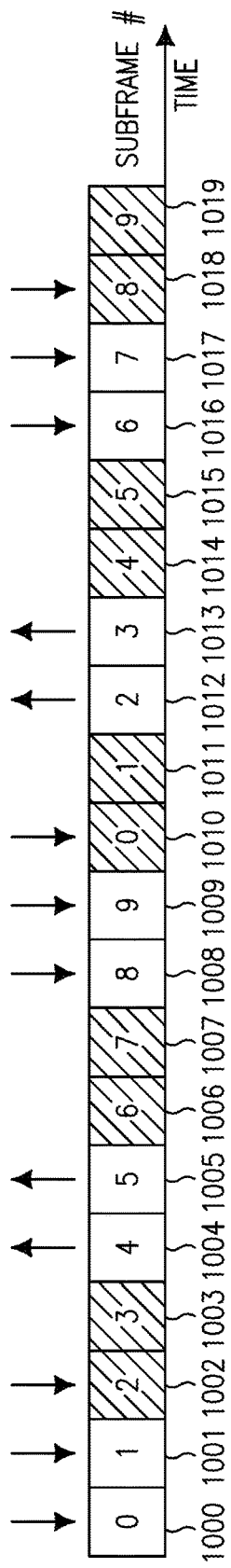

FIG. 12

WITH BURST TRANSMISSIONS

| DL | DL | SWITCH | SWITCH UL ACK | SUBFRAME # |
|---|---|---|---|---|
| 0 | 1 | 2 | 3 | 4 |
| 1200 | 1210 | 1220 | 1230 | 1240 |

FIG. 13

| DL | DL | DL | DL | DL | SWITCH | SWITCH UL ACK | SUBFRAME # |
|---|---|---|---|---|---|---|---|
| 0 | 1 | 2 | 3 | 4 | 5 | 6 | 7 | 8 |
| 1300 | 1310 | 1320 | 1330 | 1340 | 1350 | 1360 | 1370 | 1380 |

FIG. 14

| DL | DL | DL | DL | DL | DL | DL | DL | DL | DL | SWITCH | SWITCH UL ACK | SUBFRAME # |
|---|---|---|---|---|---|---|---|---|---|---|---|---|
| 0 | 1 | 2 | 3 | 4 | 5 | 6 | 7 | 8 | 9 | 10 | 11 | 12 |
| 1400 | 1405 | 1410 | 1415 | 1420 | 1425 | 1430 | 1435 | 1440 | 1445 | 1450 | 1455 | 1460 | ns.

HALF DUPLEX FDD WTRU WITH SINGLE OSCILLATOR

CROSS REFERENCE TO RELATED APPLICATIONS

This application is the U.S. National Stage, under 35 U.S.C. § 371, of International Application No. PCT/US2015/023130 filed Mar. 27, 2015, which claims the benefit of U.S. Provisional Application No. 61/971,798 filed Mar. 28, 2014, the contents of which are hereby incorporated by reference herein.

FIELD OF INVENTION

This application is in the field of wireless communications.

BACKGROUND

Machine-Type Communications (MTC) may continue expanding in the foreseeable future as wireless technology continues to advance. Today, many MTC devices are targeted for low-end (low cost, low data rate) applications that are handled by GSM/GPRS networks. Migration of MTC devices to Long Term Evolution (LTE) networks is an attractive alternative to reduce the need for operators to continue to maintain networks with different radio access technologies as well as to improve spectral efficiency. To make the migration more attractive, the MTC devices need to be low cost.

Low Cost MTC devices that utilize half duplex frequency division duplex (HD-FDD) have been proposed. In line with the desire to reduce cost, a single oscillator may be utilized which would be less expensive to manufacture but may require time to switch between uplink and downlink.

SUMMARY

A method performed in a half-duplex single oscillator wireless transmit receive unit (HD-SO-WTRU) for processing subframes is described. The HD-SO-WTRU determines whether to process either a first subframe or a second subframe based on a priority rule, where the first and second subframes are adjacent and at least one of the subframes is determined to be an uplink subframe. The HD-SO-WTRU uses at least part of the subframe it does not process for switching its oscillator frequency from the frequency of the uplink direction to the frequency of the downlink direction or vice versa.

BRIEF DESCRIPTION OF THE DRAWINGS

A more detailed understanding may be had from the following description, given by way of example in conjunction with the accompanying drawings wherein:

FIG. 3 is a timing diagram which illustrates two example HARQ process based transmissions for a SO-HD-FDD WTRU;

FIG. 4 is a timing diagram which illustrates an example HARQ process offset for SO-HD-FDD WTRU groups;

FIG. 5 is a timing diagram which illustrates an example HARQ process according to the number of oscillators for a HD-FDD WTRU; and FIG. 6 is a timing diagram which illustrates an example PDCCH-only subframe for a SO-HD-FDD WTRU.

FIG. 7 is a flowchart which illustrates an example collision handling process for a SO-HD-FDD WTRU.

FIG. 10 is a timing diagram which illustrates an example partial dropping scheme for a SO-HD-FDD WTRU.

FIG. 11 is a timing diagram which illustrates transmission timing without using burst transmissions.

FIG. 12 is a timing diagram which illustrates transmission timing with burst transmissions as it may apply to 2 downlink transmissions.

FIG. 13 is a timing diagram which illustrates transmission timing with burst transmissions as it may apply to 6 downlink transmissions.

FIG. 14 is a timing diagram which illustrates transmission timing with burst transmissions as it may apply to 10 downlink transmissions.

DETAILED DESCRIPTION

Figure 1A:
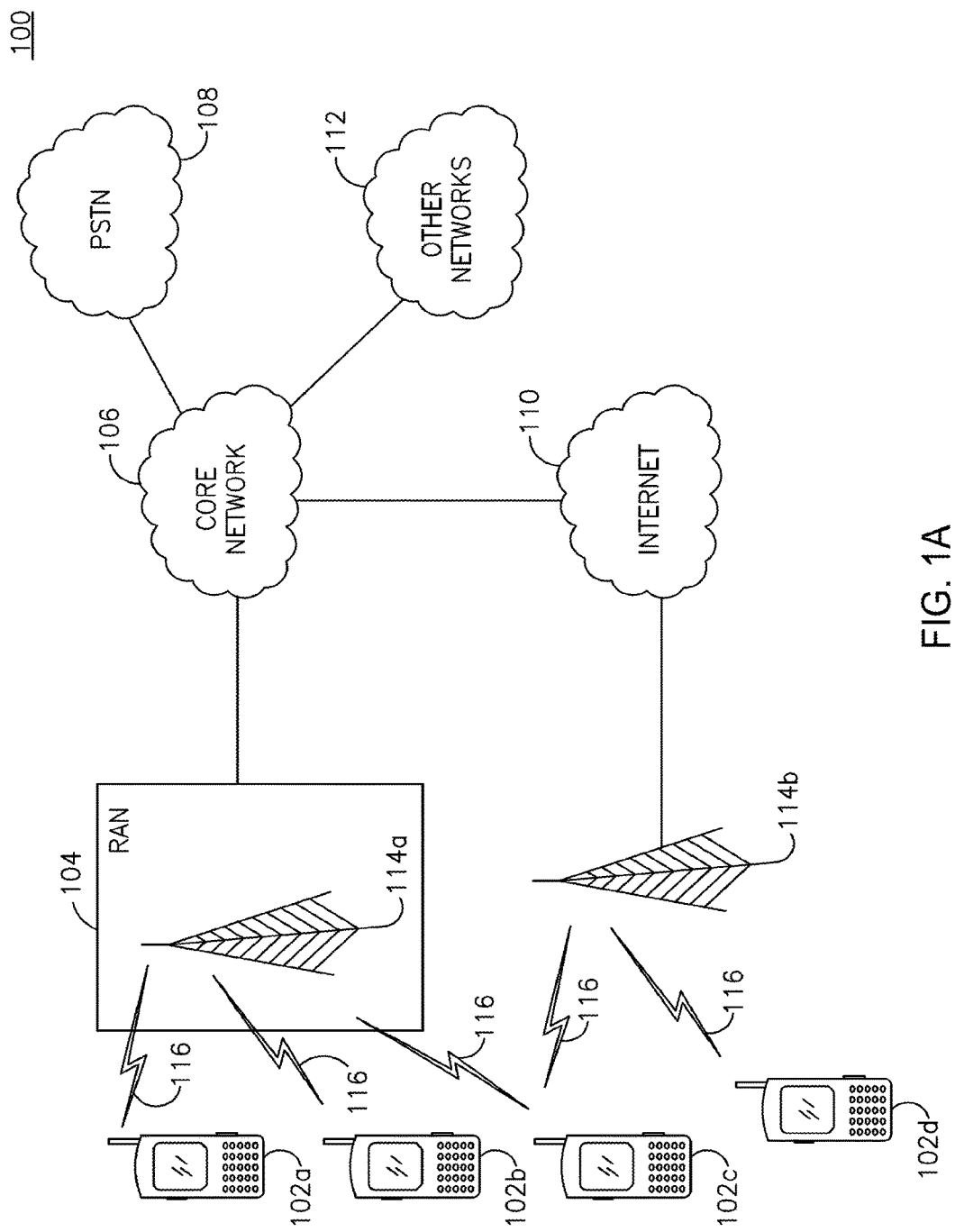
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a machine type communication (MTC) device, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
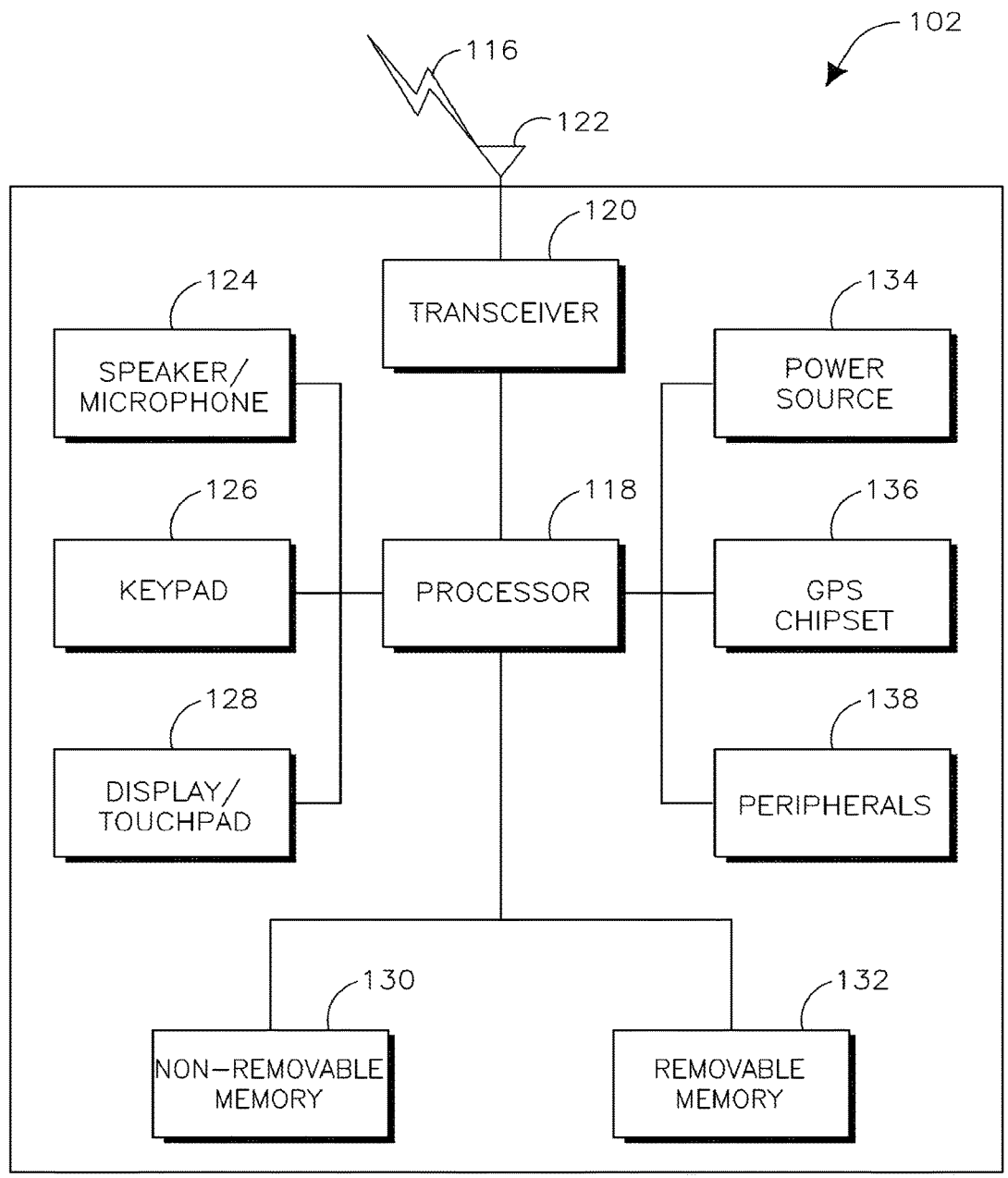
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
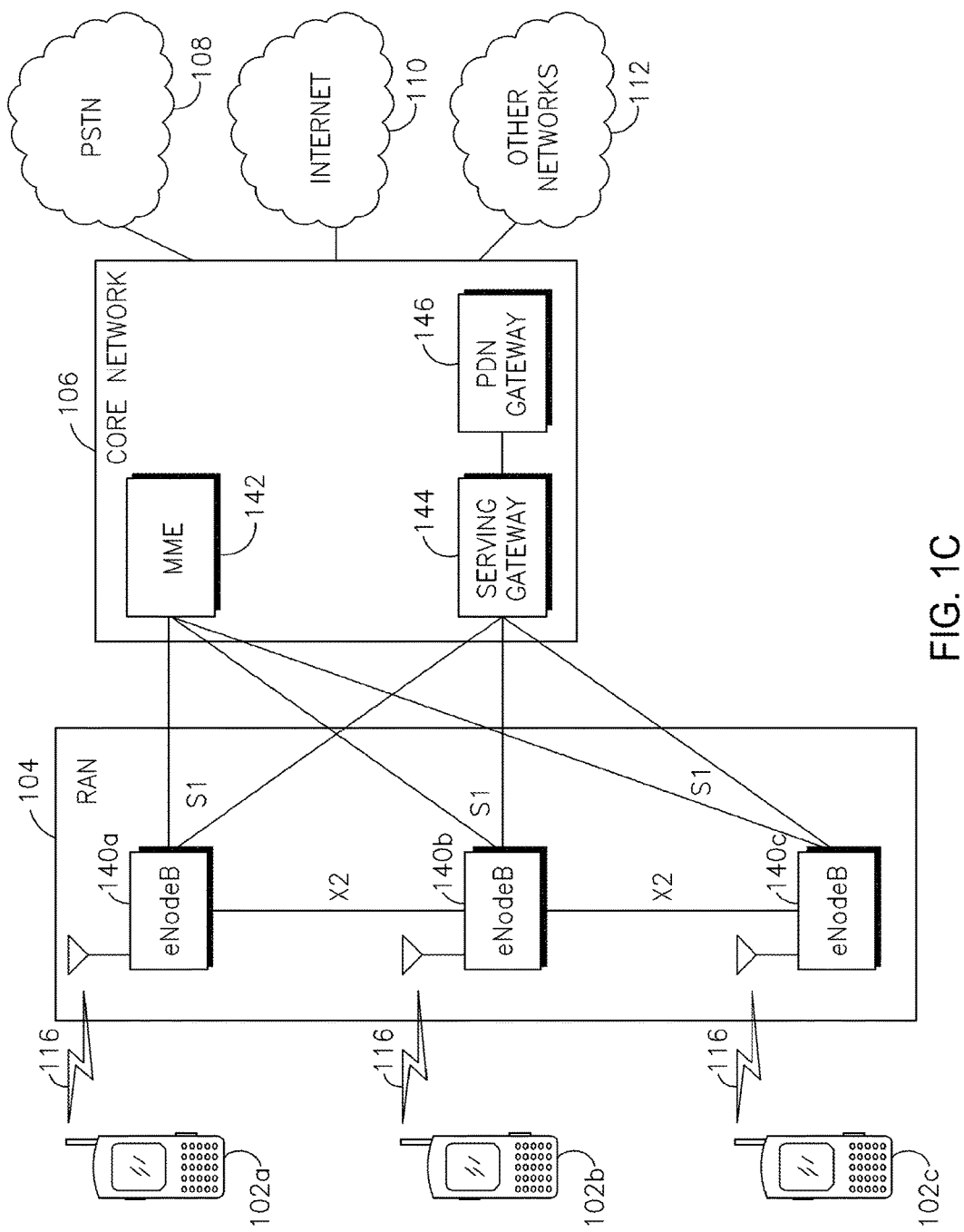
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

As LTE technology matures and its network deployment evolves, network operators may wish to reduce the cost of overall network maintenance. One way for achieving that goal may be to minimize the number of different radio access technologies used in deployment and maintenance of the network, e.g. gradually replacing the old radio access technology (e.g. GSM/GPRS) network with more spectrum efficient radio access technology network (e.g. LTE).

One example for the application of wireless communications technology may be Machine-Type Communications (MTC). MTC is a market that may continue expanding in the foreseeable future as wireless technology further advances. Today, many MTC devices are targeted for low-end (low cost, low data rate) applications that are handled by GSM/GPRS network. Due to the low cost of operations with a MTC device, there may be dampened motivation for migrating MTC to the new LTE. Such reluctance to migrate to LTE may cost network operators not only in terms of maintaining multiple RATs, but also in terms of preventing operators to reap the maximum benefit out of their spectrum (e.g., given the non-optimal spectrum efficiency of GSM/GPRS). Given the likelihood of a high number of MTC devices, the overall spectrum resources required for such devices for service provision in GSM/GPRS may be significant and inefficiently assigned.

Therefore, it may be advantageous to find a low cost LTE solution which may provide a clear business benefit to MTC device vendors and operators for migrating low-end MTC devices from GSM/GPRS to LTE networks. LTE and LTE-Advanced (LTE-A) may be used interchangeably.

A low cost MTC device may include but is not limited to a reduction of a general WTRU capability and functionality such as lower data rate, low power consumption and simpler implementation. Amongst others, approaches possible to reduce the implementation complexity may include lowering the RF component count for these devices. This may be achieved by supporting a reduced number of radio access technologies (RATs) or RF chains. Other approaches may include reducing a maximum applicable transmission power in the UL for such a device, reducing a maximum supported Rx or Tx channel bandwidth, or supporting (or operating in) half-duplex FDD mode (e.g., only).

With the introduction of low cost MTC devices into networks, there may be a need to maintain service coverage and it may be advantageous that their introduction not result in a penalty in terms of achievable spectrum efficiency during operation. It may also be advantageous for low-cost MTC devices introduced into the network to be interoperable with legacy LTE WTRUs, such that both legacy and current devices may be able to communicate on a carrier in the same network. In addition, it may be advantageous for low-cost MTC devices to support mobility and roaming.

Half duplex operation may allow a LC-MTC device, which may be classified as a WTRU category 0, to use switching rather than duplexing so that the implementation cost may be significantly reduced. In order to further reduce the cost from the half duplex capability of the LC-MTC device, a single oscillator may be used for uplink and downlink frequencies or frequency bands.

Half duplex operation has been supported for regular LTE devices, which may be classified as WTRU category 1~6, for which separate oscillators for uplink and downlink frequency bands have been used or assumed. For these devices, a relatively short maximum switching time (e.g., 20 µs) which may include oscillator adjustment time may be used or assumed for the system design. When a single oscillator is used for both uplink and downlink frequency bands, e.g., in a LC-MTC device using half duplex, additional oscillator adjustment time may need to be taken into account which may result in a longer maximum switching time, for example up to 1 ms. For HD-FDD operation with a maximum timing advance, for example 0.67 ms, the total switching time may be the oscillator switch time plus the timing advance, for example 1.67 ms.

Given that a much longer switching time (e.g., 1.67 ms) may need to be considered for switching from downlink to uplink (RX-to-TX) and/or uplink to downlink (TX-to-RX), an eNB scheduler may need to know whether the LC-MTC device with half duplex capability is implemented with a single oscillator or dual oscillators. If traffic (e.g., unicast traffic) is scheduled in either direction within the switching time, a HD-FDD WTRU with single oscillator may not receive or transmit in the same or adjacent subframes. If uplink and downlink signals are located or scheduled in the same subframe or adjacent subframes, a HD-FDD WTRU with a single oscillator may not transmit an uplink signal or may not receive a downlink signal, where the adjacent subframes may include the subframes within the switching time. If uplink and downlink signals are located in the same subframe or adjacent subframes, the WTRU behavior may be undefined. There may be an ambiguity from eNB scheduler perspective and the spectral efficiency may be significantly degraded due to long switching time.

Scheduled traffic or a scheduled transmission may be a transmission or resources for which a scheduling grant has been provided (e.g., in a DCI format) or for which resources have been allocated (e.g., for or due to HARQ retransmission or semi-persistent scheduling (SPS)). Scheduled and allocated may be used interchangeably. PUSCH and PDSCH may be scheduled or allocated transmissions. One or more of PUCCH, SRS, and PRACH transmissions may be considered to be scheduled or allocated uplink transmissions. EPDCCH may be considered to be scheduled or allocated downlink transmissions. Scheduled downlink may include broadcast, paging, and/or other system signals or channels.

Processing an uplink subframe or processing a subframe for uplink may include making a transmission such as transmitting one or more signals and/or channels in the subframe. Processing a downlink subframe or processing a subframe for downlink may include one or more of receiving and/or decoding one or more signals and/or channels in the subframe. A subframe may be processed for at least one of uplink and downlink or may not be processed. For example, a subframe used for switching may not be processed for uplink and downlink. In another example, not processing a subframe may include not receiving and not transmitting in the subframe.

Hereafter, the terms HD-FDD LC-MTC WTRU with single oscillator, category-0 WTRU with single oscillator, and single oscillator HD-FDD WTRU, SO-HD-FDD WTRU may be used interchangeably. Also, dual oscillator HD-FDD WTRU and DO-HD-FDD WTRU may be used interchangeably and may include category-0 WTRU with HD-FDD capability and other WTRU categories with HD-FDD capability. As discussed above, a WTRU may include user equipment (UE).

An adjacent subframe may be used for switching time. For example if subframe n is used as downlink and subframe n+4 is or needs to be used for uplink transmission, the subframes n+2 and n+3 may be considered as adjacent subframes which may be used for switching time. A SO-HD-FDD WTRU may not receive or transmit in an adjacent subframe, for example since adjacent subframes may be utilized by a WTRU to perform switching. For example, if two subframes are needed or used, e.g., by a WTRU, to perform switching, the subframes n−2, n−1, n+1, and n+2 may be used for switching, if the subframe n is used or determined to be for the opposite direction. In another example, if one subframe (or at least part of one subframe) is needed or used by a WTRU to perform switching, at least one of subframes n−1 and n+1 may be used for switching. The subframe n−1 and/or n+1 may be used for switching if the subframe n is used or determined to be for the opposite direction (e.g., from subframe n−1 and/or n+1). In another example, the subframes n−2 and n−1 may be used for switching, if the subframe n is used or determined to be for the opposite direction.

In another example, if subframe n is scheduled for uplink and subframe n−1 (or n+1) is not scheduled for uplink, if uplink has higher priority than downlink, the WTRU may make the scheduled transmission in subframe n and may not receive or attempt to receive downlink signals or channels in subframe n−1 (or n+1), for example regardless of whether subframe n−1 (or n+1) may have or be scheduled for downlink transmission by the eNB. If the WTRU oscillator is not already tuned for the uplink frequency in (e.g., at the beginning of) subframe n−1, the WTRU may use at least part of subframe n−1 for switching time to retune the oscillator to the uplink frequency.

A WTRU may consider a subframe to be an uplink subframe if it has scheduled or allocated uplink resources (or a scheduled or intended uplink transmission) in or for the subframe. A WTRU may use (e.g., receive in) and/or consider a subframe to be a downlink subframe if the WTRU does not have scheduled or allocated resources (or a scheduled or intended transmission) in or for the uplink in that subframe.

Hereafter, the terms "adjacent subframe", "switching subframe", and "idle subframe" may be used interchangeably.

In an approach, an eNB may be informed by the WTRU of the SO-HD-FDD capability. In an example, a certain Physical Random Access Channel (PRACH) resource may be used to indicate SO-HD-FDD capability. In another example, Category field may be used to indicate SO-HD-FDD capability. If a category-0 WTRU indicates HD-FDD capability, the WTRU may be considered as having a SO-HD-FDD capability. In this case, a subset of PRACH resources or partitioned PRACH resources may be reserved for SO-HD-FDD WTRU and the subset of PRACH resources or partitioned PRACH resources may be used to indicate SO-HD-FDD WTRU. The subset of PRACH resources for SO-HD-FDD may be broadcasted in a System Information Block (SIB) (e.g. SIB-2). A SO-HD-FDD WTRU may transmit a PRACH preamble within the subset of PRACH resources.

A radio frequency capability parameter, e.g., supportedBandListEUTRA, may be used to indicate which E-UTRA radio frequency bands are supported by the WTRU. For each band, support for half duplex operation, full duplex operation, or half duplex operation with single oscillator may be indicated.

The supportedBandListEUTRA parameter may be defined to indicate which E-UTRA radio frequency bands are supported by the WTRU. For each band, support for either only half duplex operation, or full duplex operation may be indicated. If a category-0 WTRU indicates the support of (e.g., only of) half duplex operation, the eNB may consider this WTRU as a SO-HD-FDD WTRU.

Figure 2:
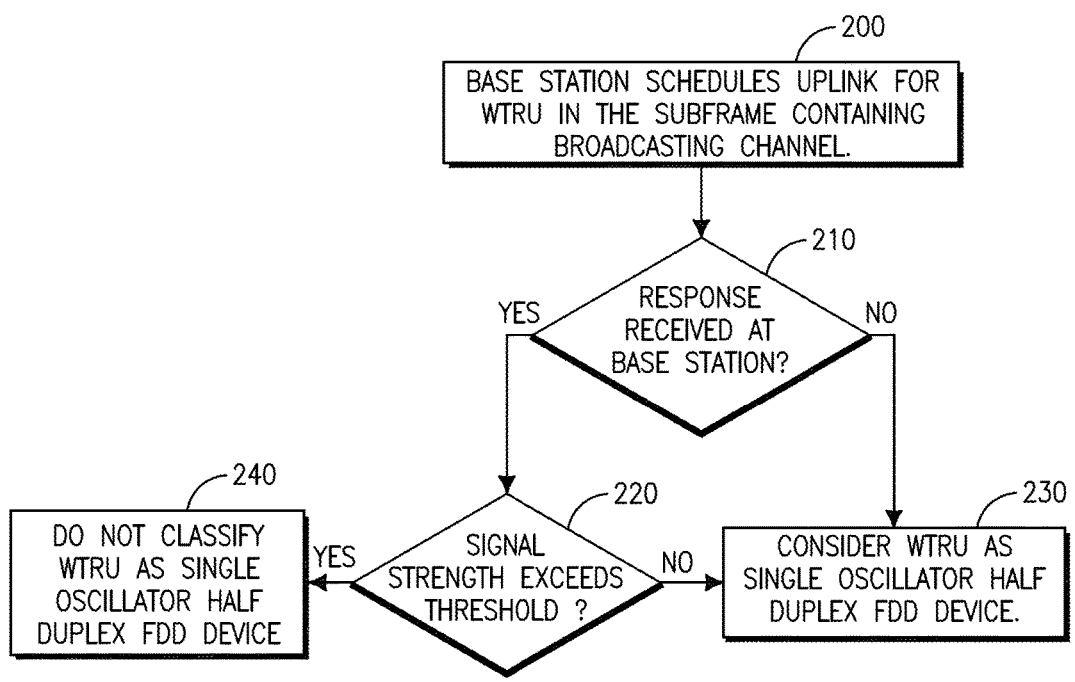
FIG. 2 is a flowchart which illustrates an example process of base station indication for a single oscillator half duplex frequency division duplexed (SO-HD-FDD) WTRU.

FIG. 2 shows a flowchart which illustrates an example process of base station indication for a single oscillator half duplex frequency division duplexed (SO-HD-FDD) WTRU. In this approach, an eNB may blindly detect the SO-HD-FDD capability without explicit indication from a WTRU. In this process, one or more of following may apply:

An eNB may schedule a Physical Uplink Shared Channel (PUSCH) at 200 for a category-0 WTRU with HD-FDD capability in an uplink subframe which is aligned with a downlink subframe (e.g. aligned in time) containing a broadcasting channel (e.g. SIB-1) and if no PUSCH transmission is detected in the granted uplink resource from the WTRU at 210, the eNB may consider the WTRU as a SO-HD-FDD WTRU.

The scheduled PUSCH transmission detection may be based on signal strength. For example, if the signal strength of the scheduled PUSCH is lower than a predefined threshold at 220, the eNB may assume or determine that the PUSCH is not transmitted from the WTRU and may consider the WTRU a SO-HD-FDD device at 230. An eNB may not consider the WTRU a SO-HD-FDD device at 240 if the eNB receives a response that does exceed the signal strength threshold set at 240. The eNB may schedule the PUSCH in an uplink subframe which is aligned with a downlink subframe containing a broadcasting channel for a predefined number and the eNB may consider the WTRU as a SO-HD-FDD WTRU if all cases satisfy the condition.

An eNB may schedule a Physical Downlink Shared Channel (PDSCH) in DL subframe n for a category-0 WTRU with HD-FDD capability where the DL subframe n+4 contains a broadcasting channel (e.g. SIB-1) and if no corresponding PUCCH is received in the UL subframe n+4, the eNB may consider the WTRU as having SO-HD-FDD capability. The corresponding Physical Uplink Control Channel (PUCCH) transmission detection may be based on the signal strength.

More generally, an eNB may schedule either an uplink signal or a downlink signal in the subframe which may contain a signal having higher priority in the opposite direction, and check whether the lower priority signal is dropped on the WTRU side. The priority rule may be used (e.g., only used) for the SO-HD-FDD WTRU.

FIG. 3 shows a timing diagram which illustrates that a subset of HARQ processes are used for a SO-HD-FDD WTRU, where a HARQ process may be defined as a uplink and downlink (re)transmission with n+4 timing. For example, if a subframe n is used for downlink, then the subframe n+4 is used for corresponding HARQ-ACK transmission. In the example shown in the FIG. 3, a WTRU which may use two consecutive HARQ processes starting with subframes 0 and 1 for downlink receptions may transmit the corresponding HARQ-ACKs in the subframe 4 and 5, respectively. In this approach, a subset of a HARQ process may be used to support a SO-HD-FDD WTRU with a single oscillator. In an example, two HARQ processes may be used for unicast traffic as shown. In this case, two consecutive HARQ processes out of eight HARQ processes may be used in order to minimize the switching time. For example, HARQ processes 0 and 1 may be used. In another example, three HARQ processes may be used with three consecutive HARQ processes out of eight HARQ processes such as HARQ processes 0, 1, and 2 but not limited to.

Alternatively, all HARQ processes for PDSCH transmission used for FDD (e.g. eight) may be used while a subset of HARQ processes may be used for PUSCH transmission. Since an asynchronous HARQ procedure may be used for downlink and a synchronous HARQ procedure may be is used for uplink, all HARQ processes may be used for downlink while a subset of HARQ processes are used in uplink. For example, eight HARQ processes may be used for PDSCH transmission and two HARQ processes may be used for PUSCH transmission. The number of HARQ process used for SO-HD-FDD WTRU may be defined or determined as a function of timing advance value.

In one example, if the timing advance value is smaller than a predefined threshold the N HARQ processes may be used while if the timing advance value is larger than the predefined threshold M HARQ processes may be used, where N>M.

The number of HARQ processes for PDSCH and/or PUSCH may be predefined as a function of the timing advance value so that a SO-HD-FDD WTRU may be implicitly informed of the number of HARQ processes according to the timing advance value.

FIG. 4 shows a timing diagram which illustrates an example HARQ process offset for SO-HD-FDD WTRU groups. A HARQ process offset may be used for one or more SO-HD-FDD WTRUs in order to maximize resource utilization. For example, the HARQ processes {0, 1} 400 410 may be used for a group of SO-HD-FDD WTRUs and the HARQ processes {2, 3} 420 430 may be used for another group of SO-HD-FDD WTRUs as shown. In this case, an eNB may split SO-HD-FDD WTRUs into two groups and use different HARQ process offsets.

FIG. 5 shows a timing diagram which illustrates an example HARQ process according to the number of oscillators for a HD-FDD WTRU. In this approach, a different number of HARQ processes may be used according to the number of oscillators. For example, two HARQ processes may be used for a SO-HD-FDD WTRU while three HARQ processes may be used for a DO-HD-FDD WTRU. In this case, consecutive HARQ processes may be used out of eight HARQ processes in order to minimize the switching time. Alternatively, a larger number of HARQ processes may be used for a DO-HD-FDD WTRU.

FIG. 6 shows a timing diagram which illustrates an example PDCCH-only subframe for a SO-HD-FDD WTRU. In this approach, an eNB scheduler may or may always consider a subset of subframe as downlink even though one or more subframes may need to be used for the uplink direction according to the HARQ procedure. The subframe 0 and 5 may or may always be considered as downlink subframes such that the eNB may not schedule any uplink transmission in the subframe 0 and 5. In another example, subframes containing broadcasting channels may be considered as downlink subframes only. In this case, the subframe n may or may always be used as a downlink subframe. The eNB may not transmit a PDCCH corresponding to a PUSCH grant in the subframe n−4 and/or adjacent subframes. The n may be subframe 0 shown at 600 and subframe 5 shown at 650. The n may be 0 and/or 5 in an even numbered radio frame and n may be 0 in an odd numbered radio frame since the SIB-1 is transmitted only in subframe 5 of the even numbered radio frame.

The subframe n may or may always be used for downlink subframe so that the eNB may not schedule PDSCH in the subframe n−4 at 610 and/or adjacent subframes in order to avoid PUCCH transmission in the subframe n. The n may be 0 and 5 in all radio frames. The n may be 0 and/or 5 in an even numbered radio frame and 0 in an odd numbered radio frame.

In another approach, an eNB scheduler may define or use a priority rule between uplink and downlink signals and the scheduling of PUSCH or PDSCH may be based on the priority rules. For example, if an eNB needs or intends to schedule PDSCH for a SO-HD-FDD WTRU in the subframe n and the subframe n contains scheduling request (SR) resources for the WTRU, the eNB may not schedule PDSCH in the subframe n, for example if SR has a higher priority than PDSCH. A periodic uplink transmission may have higher priority than PDSCH. For example, one or more of SR, periodic channel state information (CSI) reporting, and periodic sounding reference signaling (SRS) may have higher priority than PDSCH. Among the periodic CSI reporting, rank indication (RI) may have higher priority than PDSCH while other reporting types such as precoding matrix indicator (PMI) and channel quality indicator (CQI) may be have lower priority than PDSCH.

In another example, SR may have higher priority than PDSCH and other uplink transmissions may have lower priority than PDSCH. Except for SR, an eNB may schedule a PDSCH in the subframe where a WTRU may transmit periodic uplink signals. An eNB and eNB scheduler may be used interchangeably.

In another approach, an adjacent subframe (e.g., uplink subframe) may not be overlapped with (or precede or follow) subframes containing one or more of broadcasting channel, paging channel, and synch channel. An eNB scheduler may assume or expect that an (e.g., all)SO-HD-FDD WTRUs may receive broadcasting and paging channels in RRC_CONNECTED mode. In this case, an eNB scheduler may assume or expect that an (e.g., all) RRC_CONNECTED SO-HD-FDD WTRUs may monitor SIB-1, for example in order to check whether valueTag is updated or not. The eNB scheduler may schedule and/or use the subframe containing SIB-1 (e.g. the subframe 5 in an even numbered radio frame) as downlink (e.g., always) and may avoid overlapping with an adjacent subframe (e.g., uplink subframe) or may avoid scheduling uplink resources or an uplink transmission in an adjacent subframe. The eNB scheduler may avoid overlapping the subframe containing SIB-1 with a switching subframe.

An eNB scheduler may expect or assume that an (e.g., all) RRC_CONNECTED SO-HD-FDD WTRUs may monitor PDCCH with a paging radio network temporary identity (P-RNTI) in one or more of a certain set or subset of subframes (e.g., one or more of subframes 0, 4, 5, and 9 in certain radio frames). The eNB scheduler may consider the subframes potentially used for paging as downlink subframes and may avoid overlapping with an adjacent subframe (e.g., uplink subframe) or may avoid scheduling uplink resources or an uplink transmission in an adjacent subframe. The eNB may avoid overlapping subframes potentially used for paging with a switching subframe.

In an approach, an eNB receiver may assume or expect that a scheduled uplink transmission in a certain subframe may not be transmitted from a SO-HD-FDD WTRU if the scheduled uplink transmission has one or more of the following properties: (i) it is located (e.g., is to be transmitted) in a switching subframe; (ii) it is located (e.g., is to be transmitted) in an adjacent subframe to a signal in the opposite direction with a higher priority; and/or (ii) it collides with a signal in the opposite direction with a higher priority. The eNB may skip decoding the scheduled uplink signal from the WTRU in order to reduce the decoding complexity and save computational power. In an example, if a periodic SRS transmission is scheduled in subframe n and the subframe n is a (or is part of a) switching subframe or subframe n is (or is adjacent to) a downlink subframe for a SO-HD-FDD WTRU, the eNB may assume or expect that the periodic SRS is not transmitted from the SO-HD-FDD WTRU if the periodic SRS may be lower priority than a downlink signal which may be transmitted in the downlink subframe. The eNB may not decode the periodic SRS from the SO-HD-FDD WTRU. In this example, the subframe n may be an adjacent subframe of a downlink subframe which may contain a broadcasting channel (e.g., PBCH and/or SIB). The subframe n may be an adjacent subframe of a downlink subframe which may contain a PDCCH with a P-RNTI which may be targeting for the SO-HD-FDD WTRU. Alternatively, the subframe n may be an adjacent subframe of a downlink subframe which may contain a physical multicast channel (PMCH), and/or positioning reference signal (PRS).

In another example, if a periodic PUCCH transmission (e.g., a PUCCH which may carry a periodic CSI report) is scheduled in the subframe n and the subframe n is an (or is part of an) adjacent subframe of a downlink subframe, the eNB may assume or expect that the periodic PUCCH is not transmitted from a SO-HD-FDD WTRU. In this example, the subframe n may be an adjacent subframe of a downlink subframe which may contain a broadcasting channel (e.g., physical broadcast channel (PBCH) and/or SIB). The subframe n may be an adjacent subframe of a downlink subframe which may contain a PDCCH with a P-RNTI which may be targeting the SO-HD-FDD WTRU. The subframe n may alternatively be an adjacent subframe of a downlink subframe which may contain a PMCH, and/or a PRS.

In another approach, an eNB may assume or expect that HARQ-ACK repetition may be skipped in a certain uplink subframe if the SO-HD-FDD WTRU is configured with HARQ-ACK repetitions. For example, if a SO-HD-FDD WTRU is configured with HARQ-ACK repetition and if there is a downlink subframe containing certain information within the HARQ-ACK repetition, the eNB may assume or expect that the HARQ-ACK in the subframe may be skipped. In this case, an eNB receiver may not receive the HARQ-ACK repetition in the subframe n if the subframe n may be used for SIB-1 transmission in downlink. An eNB may skip receiving the HARQ-ACK repetition in the subframe n if the subframe n may be used for at least one of paging, a PMCH, a PRS, and/or a synch channel. Alternatively, an eNB scheduler may not configure HARQ-ACK repetition for a SO-HD-FDD WTRU.

In an approach, an eNB may use different link adaptation rules for the SO-HD-FDD WTRUs and DO-HD-FDD WTRUs for the (enhanced) physical downlink control channel ((E)PDCCH) and/or PUSCH. For example, if an eNB receives discontinuous transmission (DTX) corresponding to a PDCCH from DO-HD-FDD WTRU, the eNB may retransmit the PDCCH with higher transmission power and/or higher CCE aggregation level. If the eNB receives DTX corresponding to a PDCCH from SO-HD-FDD WTRU in a certain uplink subframe, the eNB may retransmit the PDCCH with the same transmission power and/or (E)CCE aggregation level. If, for example in this case, an eNB receives DTX corresponding to a (E)PDCCH in a subframe for the DO-HD-FDD WTRU or full duplex WTRU, the eNB may assume or expect that the (E)PDCCH may be missed at the WTRU receiver, for example due to lower link adaptation level, where lower link adaptation level may imply that the transmission power level or channel coding rate may be not enough to achieve a certain level of error rate. The eNB may increase the link adaptation level by adding a certain amount of transmission power or lowering channel coding rate by increasing (E)CCE aggregation levels. The link adaptation level may be adjusted as a signal-to-noise ratio (SNR) or signal-to-interference plus noise ratio (SINR) offset.

In another approach, an eNB may use different link adaptation rules for SO-HD-FDD WTRUs when the eNB receives DTX corresponding to a PDCCH according to the location of the uplink subframe. In this case, if an eNB receives DTX corresponding to a PDCCH in the subframe n for the SO-HD-FDD WTRU and the subframe n is an adjacent subframe, the eNB may not consider that the PDCCH is lost due to the link adaptation error. The same link adaptation level may be used in retransmission. Otherwise, the eNB may consider that the PDCCH is lost due to the link adaptation error and increase link adaptation level. In an example, the subframes n+1 or n−1 of a downlink subframe n containing a broadcasting channel or a downlink subframe n containing SIB-1 may be considered as adjacent subframes while subframes n+1 or n−1 of a downlink subframe n containing other SIBs may not be considered as the adjacent subframes. In another example, the subframes n+1 or n−1 of the downlink subframe n containing PMCH and/or PRS may be considered as the adjacent subframes. Alternatively, the subframes n+1 or n−1 of the downlink subframe n containing paging may be considered as the adjacent subframes.

FIG. 7 is a flowchart which illustrates an example of collision handling process for a SO-HD-FDD WTRU. In this example, a WTRU may skip either an uplink transmission or downlink reception if the WTRU is scheduled for an uplink transmission in subframe n 700 as well as downlink reception in an adjacent subframe (e.g., n−1 and/or n+1) 710. In this case, a dropping rule may be predefined or configured according to the priority between uplink signal transmission and downlink signal reception. A check of the current transmit/receive priority may be performed at 720. In one example, a downlink signal may always have higher priority than an uplink signal. In this case, if a WTRU is scheduled to receive a downlink signal such as unicast transmission, broadcasting channel, synchronization signal, paging, PMCH, and/or PRS, the WTRU may receive the downlink signal at 730 even though the WTRU is scheduled to transmit an uplink signal. The WTRU may skip the UL transmission at 750. Switching time may be needed or used by the WTRU prior to the DL reception in 730.

Alternatively, in one example, an uplink signal may always have higher priority than a downlink signal. For example, if a WTRU is scheduled to transmit an (e.g., any) uplink signal, for example PUSCH, PUCCH (e.g., for ACK/NACK or periodic CSI feedback reporting), SRS, SR, and/or a PRACH preamble, the WTRU may transmit an uplink signal at 740 even though there may be a downlink signal for the WTRU to receive in an adjacent subframe. In this case, if the WTRU is scheduled to transmit an uplink signal in the subframe n, the WTRU may skip receiving downlink signals in the subframe n as well as the adjacent subframes (e.g. subframe n−1 and/or n+1) 760, where the downlink signal may include at least one of (E)PDCCH, PHICH, PCFICH, and PDSCH. If the WTRU is not scheduled for DL in an adjacent subframe 710, the WTRU may transmit the UL signal at 740 without considering priorities between uplink and downlink signals. Switching time may be needed or used by the WTRU prior to the UL transmission in 740.

A PDSCH which may be transmitted with cell radio network temporary identity (C-RNTI) may have lower priority than uplink signals while other downlink transmissions may have higher priority than uplink signals, where the uplink signal may include at least one of PUSCH, PUCCH, SRS, and SR.

Figure 8:
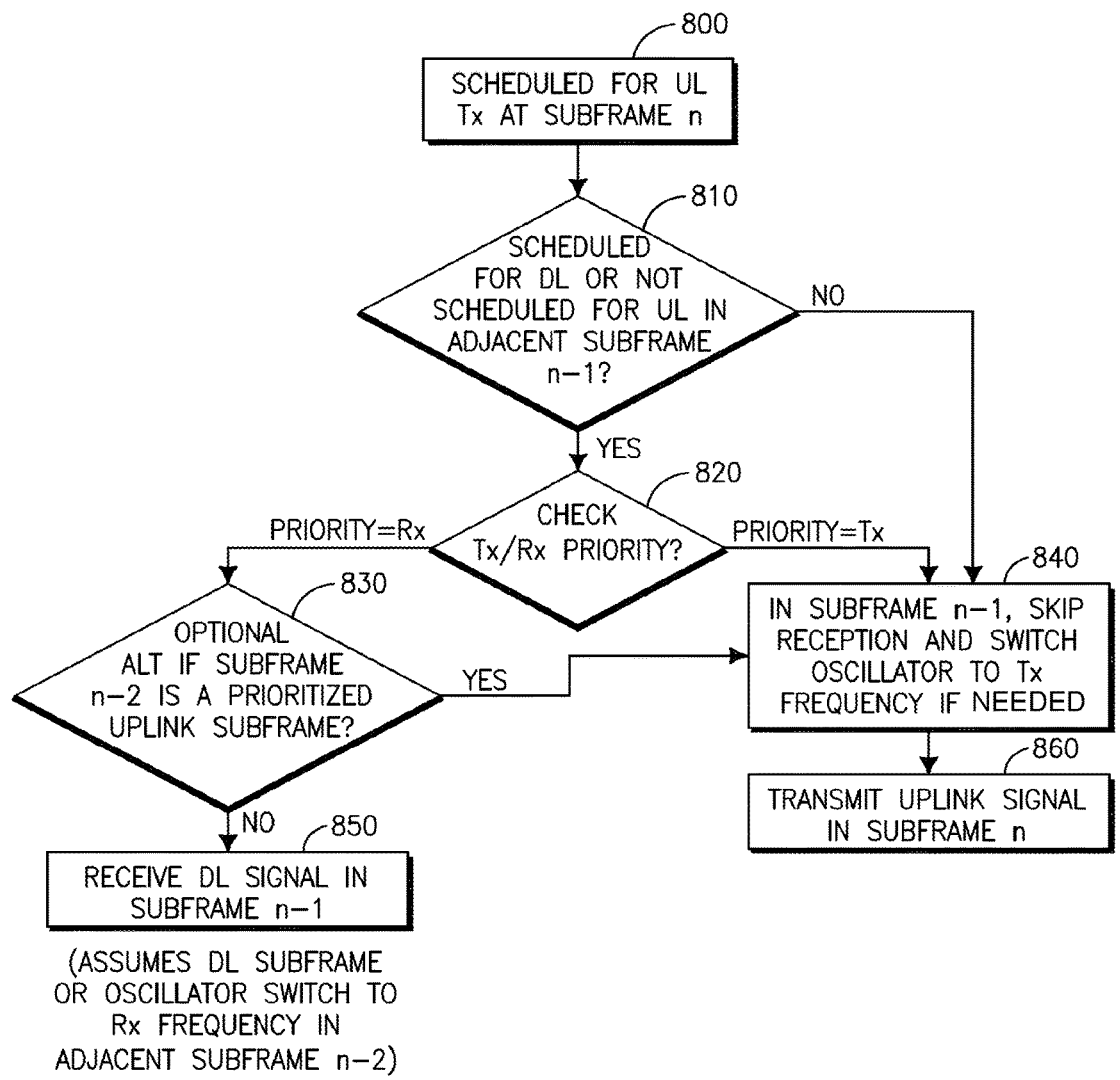
FIG. 8 is a flowchart which illustrates an alternative example of a collision handling process for a SO-HD-FDD WTRU involving a second prior subframe.

FIG. 8 is a flowchart which illustrates an alternative example of a collision handling process for a SO-HD-FDD WTRU involving a second prior subframe. In this example, a WTRU may drop either an uplink transmission or downlink reception if the WTRU is scheduled for an uplink transmission in subframe n 800 and is also scheduled for downlink reception in an adjacent subframe (e.g., n−1) 810. In this case, the dropping rule may be predefined or configured according to the priority between an uplink signal transmission and a downlink signal reception. A check of the current transmit/receive priority may be performed at 820. A downlink signal may always have higher priority than an uplink signal, or vice versa. An optional alternative may be implemented 830 which provides for consideration of subframe n−2. If subframe n−2 is a prioritized uplink subframe, the WTRU may proceed to skip reception of both subframe n−1 and subframe n in order to switch the oscillator to a transmit frequency 840. At 860 the WTRU may transmit an uplink signal in subframe n. If subframe n−2 is not a prioritized uplink subframe 830 and the downlink signal reception has a higher priority than the uplink signal transmission 820, the WTRU may proceed to reception of the downlink signal in subframe n−1 850.

Figure 9:
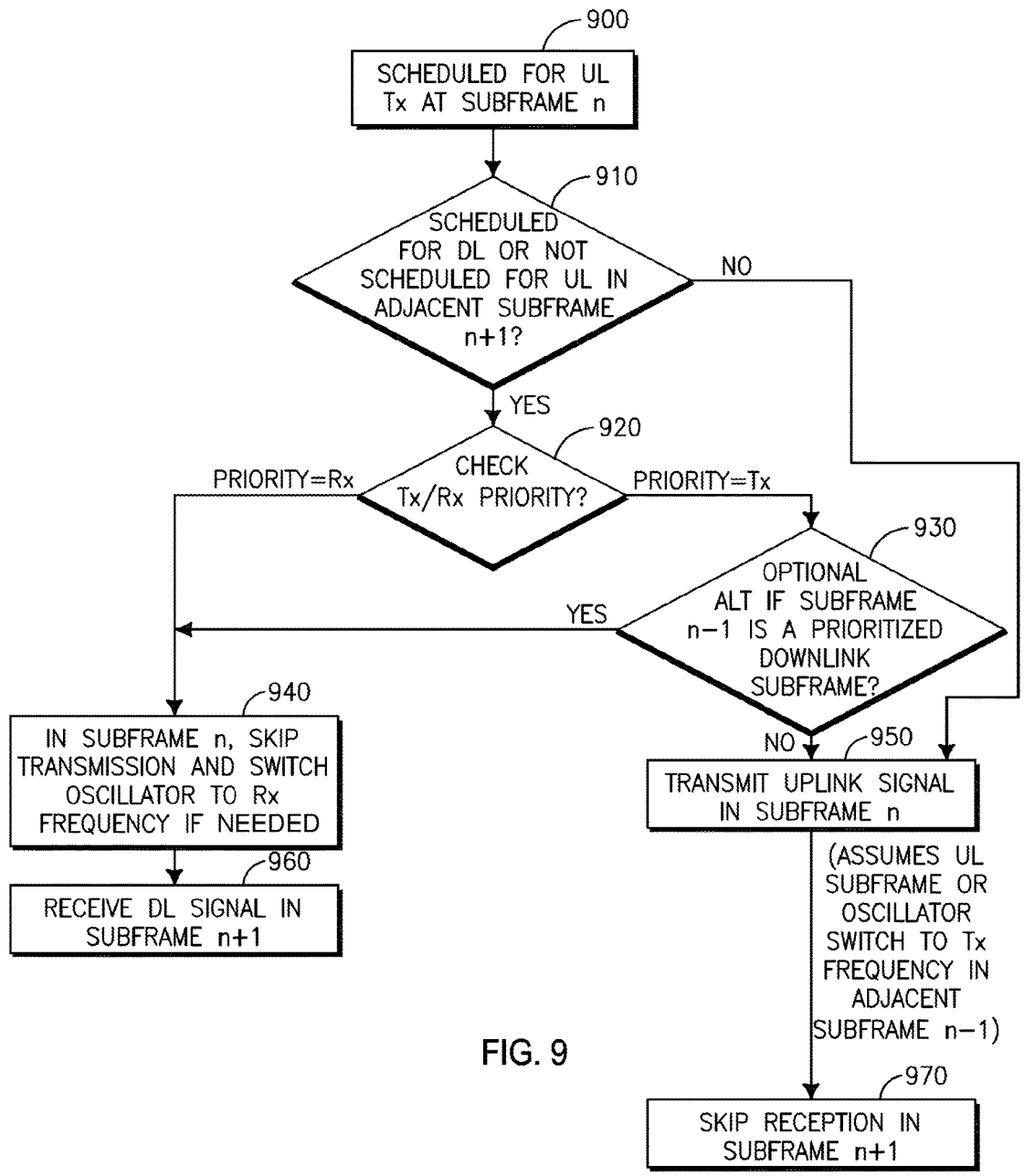
FIG. 9 is a flowchart which illustrates a further alternative example of a collision handling process for a SO-HD-FDD WTRU involving a first prior adjacent subframe.

FIG. 9 is a flowchart which illustrates a further alternative example of a collision handling process for a SO-HD-FDD WTRU involving an adjacent prior subframe. The flowchart begins with the WTRU scheduled for an uplink transmission at subframe n 900. If the WTRU is scheduled for downlink reception or not scheduled for an uplink transmission in adjacent subframe n+1 910, WTRU proceeds to check transmission/reception priority 920. An optional alternative may be implemented 930 which provides for consideration of subframe n−1. If the priority check indicates transmission, the WTRU may determine if subframe n−1 is a prioritized downlink subframe 930. If n−1 is a prioritized downlink subframe, WTRU proceeds to skip transmission and switch oscillator to receive frequency 940. Then WTRU may receive a downlink subframe at subframe n+1 960. If the WTRU is not scheduled for DL 910, WTRU proceeds to transmit an uplink signal in subframe n 950. At 970, WTRU skips reception in the subframe n+1. If subframe n−1 is not a prioritized downlink subframe, WTRU proceeds to transmit an uplink signal in subframe n 950 and may skip reception in subframe n+1 970. If the transmission/reception priority check 920 indicates receive priority, WTRU skips transmission of subframe n and switches oscillator to receive frequency 940. Then WTRU is able to receive the downlink signal in subframe n+1 960.

The channel state information reference signal (CSI-RS) measurement may have lower priority than a scheduled uplink signal. For example, if a WTRU needs (or has configured resources) to measure a CSI-RS in a subframe and the subframe is either an adjacent subframe of a scheduled uplink subframe or is a scheduled uplink subframe, the WTRU may skip measuring the CSI-RS in the subframe. The WTRU may transmit the scheduled uplink transmission.

Broadcasting channels may have higher priority than an uplink signal. In an example, if a WTRU is scheduled to transmit an uplink signal in a subframe n and the subframe n is either an adjacent subframe of a downlink subframe which may contain a broadcasting channel or the downlink subframe, the WTRU may drop the uplink transmission. If a WTRU is in RRC_CONNECTED mode, the subframe containing SIB-1 may be considered as always a downlink subframe so the WTRU may drop any uplink transmission for the subframe containing SIB-1 and/or associated adjacent subframes. The subframe containing one or more other SIBs may be considered as a downlink subframe within a modification period if broadcasting information is updated. The subframe n may be an adjacent subframe, uplink subframe, or downlink subframe. FIG. 10 shows a timing diagram which illustrates an example of a partial dropping scheme for a SO-HD-FDD WTRU. In this approach, a WTRU may drop a part of downlink or uplink subframe which it overlaps. For example, if a downlink reception is overlapped with an adjacent subframe of an uplink transmission, a part of the downlink subframe may be received. A WTRU may receive a PDCCH in the subframe while the WTRU may skip receiving the PDSCH part of the subframe. In this case, two types of subframes in which a SO-HD-FDD WTRU only receives a PDCCH may be defined such as a multicast/broadcast over single frequency network (MBSFN) subframe and the adjacent subframe right after the last downlink subframe. The non-MBSFN subframes where a SO-HD-FDD WTRU receives PDCCH only, may be defined as a PDCCH only subframe. These subframes are shown at 1002 1010 1018. In a PDCCH only subframe, a DO-HD-FDD WTRU may receive both PDCCH and PDSCH.

Two types of non-MBSFN downlink subframes may be defined such as a PDCCH only subframe 1002, 1010, and 1018 and a PDCCH+PDSCH subframe 1000, 1001, 1004, 1005, 1008, 1009, 1012, 1013, 1016, and 1017. In the PDCCH only subframe, the WTRU may monitor the PDCCH only while in the PDCCH+PDSCH subframe the WTRU may monitor the PDCCH and may receive signals in the PDSCH region.

The PDCCH only subframe may be implicitly configured according to the uplink grant. For example, if a PUSCH is scheduled in the subframe n, the WTRU may receive the PDCCH only in the subframe n−2 even though the subframe n−2 is a non-MBSFN subframe. In this case, if PDSCH is scheduled in the PDCCH only subframe, the WTRU may skip receiving corresponding PDSCH and transmit NACK to the eNB. If PDSCH is scheduled in the PDCCH only subframe, the WTRU may skip receiving corresponding PDSCH and transmit DTX to the eNB. The PDCCH only subframe may be implicitly configured as a function of timing advance value used. For example, if a timing advance value of a WTRU is larger than a predefined threshold, the WTRU may skip monitoring the PDCCH in the PDCCH only subframe. If a timing advance value of a WTRU is smaller than the predefined threshold, the WTRU may monitor the PDCCH in the PDCCH only subframe. The PDCCH common search space may only be monitored in the PDCCH only subframe.

In an approach, if a WTRU is configured to measure CSI-RS in the subframe n and the subframe n is in an adjacent subframe for an uplink transmission or is a subframe (e.g., an uplink subframe) in which a WTRU is scheduled to transmit an uplink signal, the WTRU may skip receiving the CSI-RS in the subframe n for CSI measurement. If a WTRU is (or is required or expected) to report CSI corresponding to the CSI-RI transmitted in the subframe n, the WTRU may transmit the latest CSI measured before the subframe n. If a WTRU does not have the latest CSI measured before the subframe n, the WTRU may report a default value, where the default value may be a predefined value which may be used when the measured CSI is not available. The latest CSI measured may include CQI, PMI, and/or RI.

If a WTRU is configured to or required to report CSI corresponding to the CSI-RS transmitted in the subframe n, the WTRU may transmit the latest CSI measured if the CSI is updated from the latest reporting.

If a WTRU is requested to report CSI, the WTRU may first check whether the CSI is updated or not from the latest CSI reporting. If the CSI is not updated from the latest reporting, the WTRU may not report CSI and a null signal may be transmitted.

In another approach, if a WTRU is configured to or required to report CSI in the subframe n and the WTRU needs to receive a downlink signal in the subframe n, the WTRU may either report CSI or receive a downlink signal according to the CSI update condition. For example, if the CSI is not updated from the latest reporting, the WTRU may drop the CSI reporting and may receive a downlink signal in the subframe. Otherwise, the WTRU may report CSI and skip receiving the downlink signal according to the priority.

If the downlink signal has a higher priority than the CSI reporting, then the WTRU may receive the downlink signal irrespective of the CSI update condition. Alternatively, if the downlink signal has a lower priority than the CSI reporting, then the WTRU may either drop CSI reporting or transmit CSI reporting according to the CSI update condition.

FIG. 11 is a timing diagram which illustrates transmission timing without using burst transmissions. In this case, A FDD LC-MTC WTRU with a single oscillator may have a switching time RX-to-TX (i.e. DL-to-UL) and TX-to-RX (i.e. UL-to-DL) of a 1 ms excluding the round trip time (RTT). As a consequence, a scheduled DL transmission in subframe n with A/N feedback expected in UL subframe n+4 may cause a n+3 DL-to-UL switch, an n+4 UL transmission of the A/N, and then n+5 switch to DL frequency. Then the n+6 subframe would be ready for DL reception. For example, a downlink occurs at subframe 0 1100, switch operation at subframes 1-3 1110, an upload at subframe 4 1120, switch at subframe 5 1130, and a downlink reception at subframe 6 1140. For cell edge WTRUs a 2 ms loss in scheduling opportunities may be envisioned since the RTT time may be added to the 1 ms switching time. In order to increase spectrum efficiency for these WTRUs, burst transmissions may be used in both directions, DL and UL, as well as bundled A/N feedback for the entire burst, similar to the time division duplex (TDD) technique.

In another approach, the LC-MTC may maintain an n+4*k (where k may be an integer or a natural number) feedback rule while bundling A/N for the DL scheduled data. That means the window size for DL burst transmissions may have but are not limited to the following examples detailed in FIGS. 12-14.

FIG. 12 illustrates by example 2 downlink subframes 1200-1210, 3 switch subframes, 1220, 1230, and an uplink A/N subframe 1240. The WTRU may bundle 2 A/N bits into a single PUCCH format 1b transmission 1240 in n+4 while n+3 1230 may be used for switching time.

FIG. 13 illustrates by example 6 downlink subframes with n+7 1370 as a switch point and n+8 1380 as a feedback point. The WTRU may bundle 6 A/N into a single PUCCH transmission in subframe n+8 1380.

FIG. 14 illustrates by example 10 downlink subframes 1400-1445 with n+11 1455 as a switch point and n+12 as a UL PUCCH with 10 A/N bundled 1460. In this configuration PUCCH format 3 can be used.

In this case, the rule for DL burst transmissions for the window size may be derived as $$\text{Window\_size} = 4*n+2, \text{ where } n \text{ is a positive integer.} \quad \text{(Equation 1)}$$

The maximum Window_size value may be taken as the maximum number of A/N bits PUCCH format 3 can carry without making an AND operation between A/N of the received transport blocks so a 1-to-1 A/N mapping is sent to the eNB, avoiding the repetition of the entire burst in case of a subframe reception failure. The A/N bits mapping for PUCCH format 3 may be a concatenated string starting with the first received subframe A/N, second received subframe A/N, and so on. The remaining unused A/N bits may be padded.

In another approach, where the window size may be smaller (2~4 subframes), choosing a simple AND indicator for a small burst (example 2 subframes) can be acceptable so PUCCH format 1 or 2b can be used. When 2 A/N bits are available in PUCCH, then each bit can be an AND for two pairs of transport blocks for example.

In another approach, the WTRU may follow one or more rules for bundled feedback. After the end of the DL burst, the last subframe being n+k, where k is the size of the DL burst in subframes, the WTRU may bundle the A/N in the n+k+4 subframe UL transmission. In this approach, the burst size limit would follow the PUCCH A/N capacity.

A second possible rule that may make room for the switching time is to have the UL bundled feedback at subframe m defined as:

$$m = n + \text{Window\_size} + \text{MOD4}(n) + 1 \quad \text{(Equation 2)}$$

This may ensure that the WTRU uses the first multiple of 4 based at n subframe after n+k burst for its UL bundled feedback.

The UL burst may be done similarly to TDD and the WTRU will receive its multiple A/N over a physical hybrid ARQ indicator channel (PHICH) which can multiplex the A/N over multiple PHICH as per multiple WTRUs multiplexing following the last UL subframe from the WTRU data burst. Thus the eNB may multiplex multiple PHICH A/N for this UL burst.

In another approach, a WTRU may be configured with a designated feedback subframe offset for DL and/or UL for the burst window size or with multiple offsets specific to each window size from a configured set.

In order to assist a clear SO-HD-FDD burst transmission operation, the eNB may signal the DL and/or UL burst window size. In an approach, the window size for DL and UL may be broadcasted via one of the SIBs using a bitmap or a combination of bits that will map to several default burst configurations as an optional or mandatory IE. If the IE is not broadcasted, the WTRU may use normal operation.

In another embodiment, the window size for DL and UL may be semi-statically configured by RRC signaling using a Configuration or Reconfiguration message. Alternatively the WTRU may receive a set of window sizes that the WTRU may use.

The semi-static configuration may contain an expected A/N bundled feedback subframe offset that the WTRU should follow for DL and or UL configured burst window size(s). The offset may count from the start or from the end of the burst window size subframe. This offset may be unique or may have a specific value for each window size.

In another approach, a downlink dynamic configuration may be used. Based on the amount of data from the eNB buffer, a larger or smaller burst transmission window size may be signaled. This may be accomplished through an explicit signaling in a DCI (e.g. combination of bits within a DCI) carried over a (E)PDCCH that the WTRU may receive in order for proper reception of the burst transmission. This window size may be based on a set of default window sizes that the WTRU may assume or know.

Alternatively the WTRU may follow (E)PDCCH decoding and an "window burst end bit" can be used by eNB in the last DCI related to the burst window to signal the end of the burst data.

In another approach, an uplink dynamic configuration may be used. In addition to the semi-static configurations a more dynamic scheme can be envisioned as a stand-alone or a combination of both:

Upon a Scheduling Request (SR) sent by the WTRU, the eNB may signal as a part of the UL grant, the window size to be used. The signal may be an explicit combination of bits that the WTRU may interpret as one of the semi-statically configured UL window sizes.

Upon receiving a Buffer Status Report (BSR), the eNB may increase the widow size or decrease it based on the amount of data from the WTRU buffer using any method described herein regarding uplink dynamic configuration.

Upon receiving a Power Headroom Report (PHR) from a WTRU, the eNB may adapt the modulation and coding scheme (MCS) and UL grants (link adaptation) and the window size in order to adapt the WTRU transmissions in correlation with the last received BSR report.

Additionally the WTRU may use a medium access control (MAC) control element (CE) to signal the UL burst window size or a UL burst window size modification. The WTRU may use a part of a PUCCH payload to signal the UL burst window size. Alternatively the WTRU may include in the last UL burst subframe an UCI with the End of Burst data indication.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method performed by a half-duplex single oscillator wireless transmit receive unit (HD-SO-WTRU) for processing subframes, the method comprising:
   determining, based on a priority rule, a subframe to process from an uplink subframe for transmission to a base station and a scheduled downlink subframe for reception from the base station, wherein the uplink subframe and the scheduled downlink subframe collide with each other; and
   processing, by the HD-SO-WTRU, the determined subframe;
   wherein the priority rule indicates that downlink is a higher priority than uplink.

2. The method of claim 1 wherein the scheduled downlink subframe is a broadcast subframe.

3. The method of claim 1 wherein the uplink subframe includes a scheduling request.

4. The method of claim 3, wherein the scheduled downlink subframe is scheduled by a machine type communication (MTC) physical downlink control channel (PDCCH) of the base station.

5. The method of claim 4, wherein the scheduled downlink subframe is scheduled using a cell radio network temporary identifier (C-RNTI).

6. The method of claim 1 wherein the priority rule indicates that a periodic channel state information (CSI) reporting uplink transmission is a lower priority than a downlink reception.

7. The method of claim 1 wherein the priority rule indicates that a periodic sounding reference signal (SRS) uplink transmission to the base station is a lower priority than a downlink reception from the base station.

8. The method of claim 1 wherein the priority rule indicates that a pre-coding matrix indicator (PMI) or channel quality indicator (CQI) reporting uplink transmission to the base station is a lower priority than a downlink reception from the base station.

9. The method of claim 1 wherein the priority rule indicates that a downlink reception for a Channel State Information Reference Signal (CSI-RS) measurement from the base station is a higher priority than an uplink transmission to the base station.

10. A half-duplex single oscillator wireless transmit receive unit (HD-SO-WTRU) for processing subframes, comprising:
    a processor configured to determine, based on a priority rule, a subframe to process from an uplink subframe for transmission to a base station and a scheduled downlink subframe for reception from the base station, wherein the uplink subframe and the scheduled downlink subframe collide with each other; and a transceiver configured to process the determined subframe;

wherein the priority rule indicates that downlink is a higher priority than uplink.

11. The HD-SO-WTRU of claim 10 wherein the scheduled downlink subframe is a broadcast subframe.

12. The HD-SO-WTRU of claim 10 wherein the uplink subframe is an uplink scheduling request subframe.

13. The HD-SO-WTRU of claim 12, wherein the scheduled downlink subframe is scheduled by a machine type communication (MTC) physical downlink control channel (PDCCH) of the base station.

14. The HD-SO-WTRU of claim 10 wherein the priority rule indicates that a periodic channel state information (CSI) reporting uplink transmission to the base station is a lower priority than a downlink reception from the base station.

15. The HD-SO-WTRU of claim 10 wherein the priority rule indicates that a periodic sounding reference signal (SRS) uplink transmission to the base station is a lower priority than a downlink reception from the base station.

16. The HD-SO-WTRU of claim 10 wherein the priority rule indicates that a pre-coding matrix indicator (PMI) or channel quality indicator (CQI) reporting uplink transmission to the base station is a lower priority than a downlink reception from the base station.

* * * * *